Aug. 1, 1967                H. L. ERICKSON                3,333,602
                        DUAL SAFETY VALVE ASSEMBLY
Filed Aug. 4, 1964                                    3 Sheets-Sheet 1
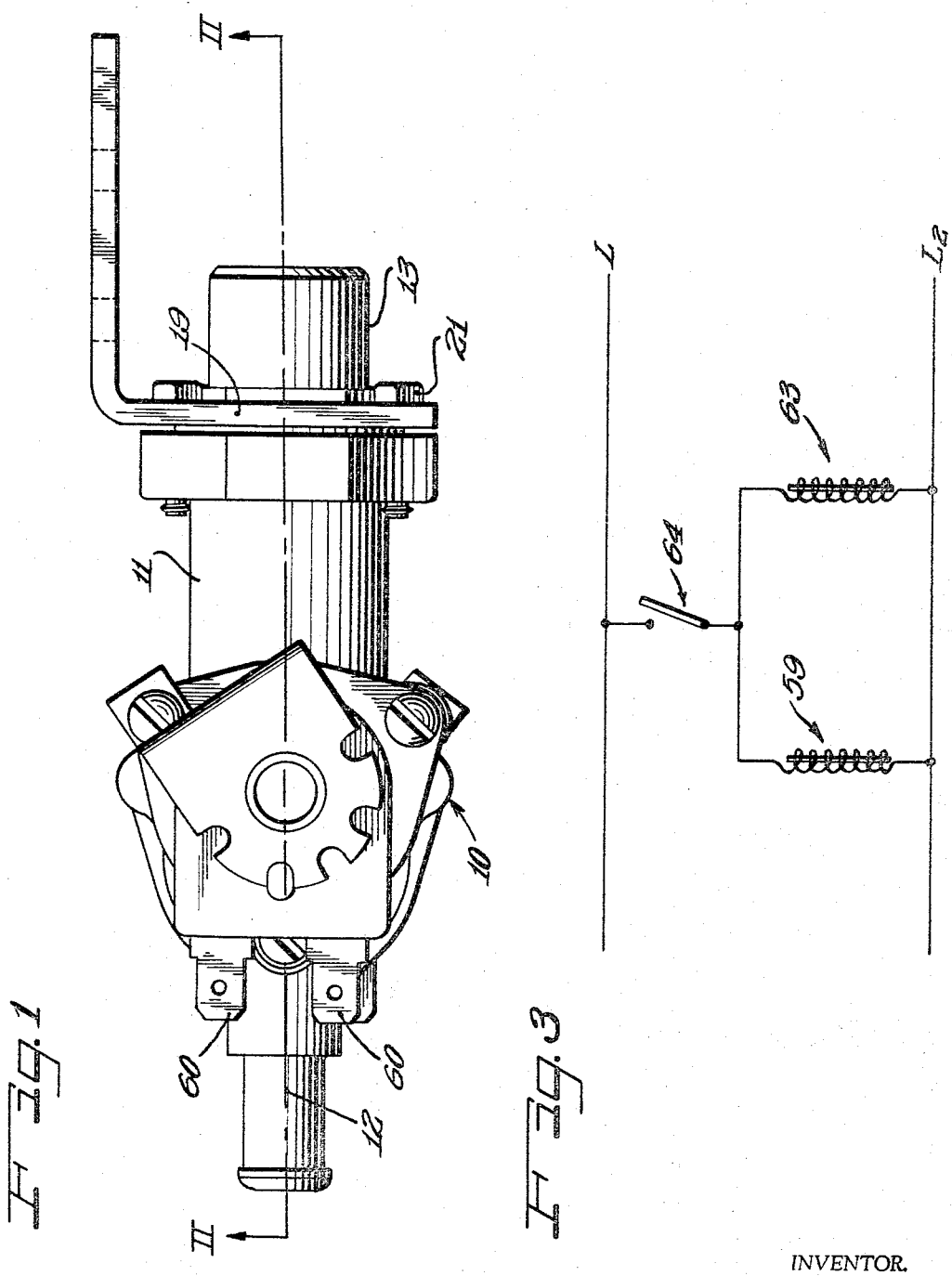
INVENTOR.
Howard L. Erickson
BY
Hill, Sherman, Meroni, Gross & Simpson
ATTORNEYS

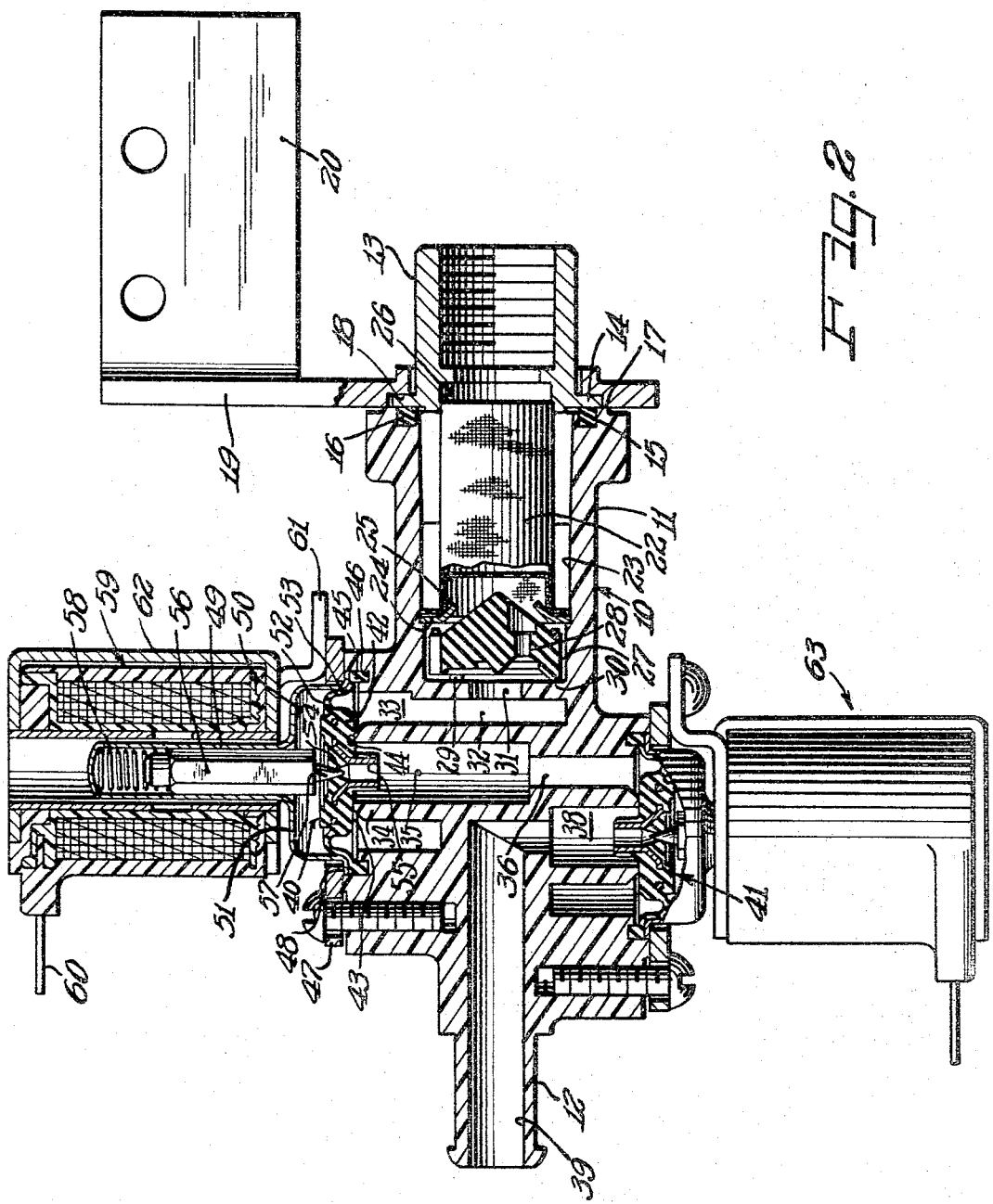

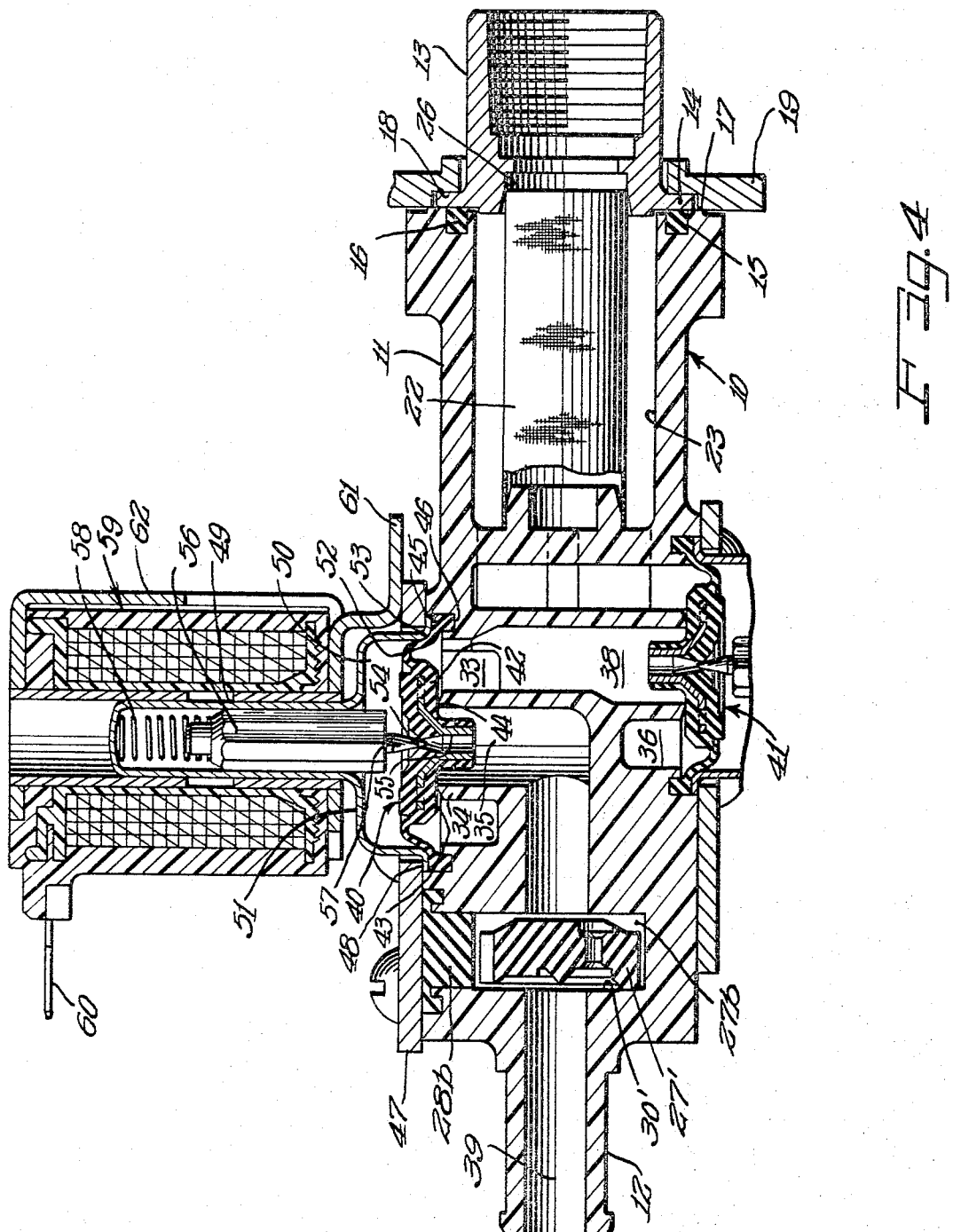

United States Patent Office 3,333,602
Patented Aug. 1, 1967

3,333,602
DUAL SAFETY VALVE ASSEMBLY
Howard L. Erickson, Bensenville, Ill., assignor to The Dole Valve Company, Morton Grove, Ill., a corporation of Illinois
Filed Aug. 4, 1964, Ser. No. 387,361
3 Claims. (Cl. 137—614.11)

The present invention relates to fluid control valves and more particularly relates to a fluid shut-off valve which is designed particularly for use in clothes washers or dish washers or the like and which have a safety feature which will insure that valve malfunction resulting in nonclosure of the valve at the proper time in the cycle of operation of the appliance with which it is associated will be prevented.

Pneumatically and electrically actuable shut-off valves, in particular, have been used extensively in recent years in controlling the flow of water to dish washers and clothes washers. They are generally operated under the control of a timer or the like (sometimes a manual control) and are effective when energized to permit flow of a quantity of water therethrough. Generally, the types of valve means used to control the flow of water through the valve are fluid pressure operated and their fluid pressure operation is only controlled by electrical or pneumatic or manual means. Such valves are normally biased to a port closing position and are movable to a port open position upon energization of the valve control means.

In any event, difficulties have been experienced in the field with the closing of such valves. Rust particles are often present in the water flowing through the valve (being picked up from the piping through which the water flows) and, although strainers are normally employed at the inlets to the valves, some particles, although small enough to pass through the strainer, may become entrapped between the valve member and its respective seat to prevent complete closure of the valve member. In other instances, small foreign particles may become wedged in the small bleed port or ports of the oft used fluid pressure operated diaphragm valves. Still further, in a good many cases the formation of a small burr on a solenoid armature or on the guide within which it is received will cause the armature to "hang up" and valve member closure will thereby be prevented. In any event, there are a good many causes for the failure of valve members to close properly at the proper time and such failure to close may cause flooding of the machine and consequently of the room within which it is positioned.

It is an object of the present invention to provide a fluid shut-off valve adapted for use in washing machines and dish washers and the like which will obviate the above noted disadvantageous characteristics of prior types of shut-off valves.

More specifically, an object of the invention resides in the provision of a valve assembly having a pair of serially interconnected shut-off valves which must each be open in order for fluid to pass through the valve.

Another object of the invention resides in the provision of a valve assembly having serially interconnected valve members wherein means are provided for simultaneously actuating the valve members.

These and other objects, advantages, and features of the present invention will become apparent from time to time as the following specification proceeds and with reference to the accompanying drawings, wherein:

FIGURE 1 is a top view of a valve assembly constructed in accordance with the principles of the present invention;

FIGURE 2 is a vertical sectional view of the assembly shown in FIGURE 1 and taken along lines II—II of FIGURE 1, showing some parts in side elevation for the purpose of clarity;

FIGURE 3 is a diagrammatic representation of the circuitry which might be employed for controlling the operation of the valve assembly shown in FIGURES 1 and 2, and FIGURE 4 is a vertical sectional view of a valve assembly much like that shown in FIG. 2 but illustrating another embodiment of the invention wherein a flow control member is positioned within the valve outlet rather than the inlet.

In the drawings, the valve body 10 is formed of a molded plastic material and includes an inlet boss 11 and an outlet nipple 12. A metallic inlet connecting boss 13 has an irregularly shaped outwardly extending flange 14 formed integrally therewith which is seated on an annular seal 15 which, in turn, is seated within an annular groove 16 formed in the face 17 of the outer end of the inlet boss 11. The irregularly shaped outwardly extending flange 14 is received within a complementary socket 18 formed in a metal hanger 19 which hanger has a flat plate 20 extending at right angles therefrom and forming a mounting bracket. The hanger 19 is attached to the inlet boss 11 by means of a plurality of screws 21 extending through the hanger and into the boss 11. In this manner, the high torques sometimes applied to the inlet fitting in order to tightly connect pipes or the like thereto are borne by the metal hanger 19 rather than by the breakable plastic body 10.

A strainer 22 is cylindrical in configuration and is fitted within the inlet passage 23 formed in the inlet boss 11. The strainer 22 has its left hand end seated on a retainer 24 which retainer has inturned fingers 25 which engage the strainer screen 22 and cooperate with the cylindrical wall 26 of the inlet fitting 13 to center the strainer within the passage 23. A tri-orifice flow control member 27 having a plurality of orifices 28 formed therethrough (only one of the three orifices in this flow control member being shown in the drawing) is positioned within the inlet passage 23 at the innermost end thereof and has a plurality of integrally formed feet 29 seated on shoulder 30 of the valve.

An opening 31 is formed through a wall of the valve body and communicates the inlet passage 23 with a passage 32 which opens to an annular passageway 33 formed at the upper end of the valve body 10. A cylindrically configurated wall 34 serves to partition the annular passageway 33 from a flow passage 35 which is formed within and concentrically of the annular passageway 33. The flow passage 35, in turn, opens to an annular passageway 36 opening to the lower or under side of the valve body 10. A cylindrically configurated wall 37 serves to partition the flow passageway 36 from the concentric flow passage 38. Flow passage 38, in turn, is communicable with outlet passageway 39 which extends through the outlet nipple.

The flow of fluid through the valve body 10 is controlled by a pair of fluid pressure operated, solenoid controlled, diaphragm valves 40 and 41 in a manner which will hereafter be described. Since the operation of each of the valves is identical, however, a description of the operation of the valve 40 will suffice. Fluid pressure operated valves of the type shown in the drawings are well known and need not be discussed in detail.

In general, suffice it to say that the diaphragm 40 has a central thickened portion 42 which presents a flat valving surface 43 that is engageable with a flat annular valve seat 44 which comprises the annular lip presented by the outer end of the wall 34. A bead 45 is formed about the periphery of the diaphragm 40 and is seated within an annular groove 46. The peripheral bead 45 is maintained in its proper seated position in the groove 46 by a plate 47 which is screw threaded to the valve body 10 and which engages the peripheral flange 48 of an armature guide 49 to press the flange 48 onto the top of the diaphragm bead 45. A chamber 50 is formed between the upper surface of diaphragm 40 and the bowed-out section 51 of armature guide 49. A small bleed hole 52 is provided in the thin web section 53 of the diaphragm 40 which has a smaller flow area than that of a central flow passage 54. In many instances, several bleed passages are formed within the thin web section of the diaphragm but in such cases the collective flow area of the bleed ports is substantially less than the flow area through the central port 54. In any event, it will be observed that upon opening of the central flow port 54 fluid will pass from the chamber 50 to the flow passage 35 faster than it will flow from the inlet annular passageway 33 into the chamber 50 and the differential in pressure across the diaphragm will cause it to be unseated. Conversely, upon closure of the central orifice 54, the pressure of fluid communicated to the chamber 50 from the annular passageway 33 will act to force the diaphragm to a seated position (there being a low pressure area at the vortex created immediately adjacent the upper end of the flow passage 35).

In the illustrated assembly, the diaphragm 40 has a metallic grommet 55 embedded therein which depends from the valving face 43 and is surrounded by a thin walled rubber section.

An armature 56 is guided for rectilinear movement within the guide 49 and has a pointed valving end 57 formed thereon which is cooperable with the main flow port 54 to control the flow of fluid therethrough. A compression spring 58 is interposed between the upper end of the armature 56 and the uppermost end of the guide 49 and serves to bias the armature to the position shown. An encapsulated spool-wound coil assembly 59 having terminals 60 extending therefrom is seated over the guide 49 and is secured on the valve body by means of an outturned tab 61 formed integrally with a bracket 62 which is fitted about the coil assembly 59 and which tab is secured to the valve body by one of the screws serving to mount the plate 47 thereto.

As is well know in the art, upon energization of the solenoid assembly the armature 56 will be retracted within the guide 49, fluid will flow from the chamber 50 through the flow passage 35 faster than it enters chamber 50 from the inlet 33, and the valve member 40 will be unseated.

With the present arrangement it will be observed that the outlet side of the valve member 40 is the inlet side of the valve member 41 and that these valve members are thus serially connected in the flow path through the valve body 10 so that they must be simultaneously energized in order to permit fluid to flow through the valve.

In FIGURE 3 it will be observed that the solenoid assembly 59 is wired in parallel with solenoid assembly 63 (the latter being the solenoid assembly employed to control operation of the valve member 41) and that closure of a switch 64 will serve to energize the two solenoid assemblies simultaneously. Obviously, the switch 64 could be operated by a timer or through some manual means.

In FIGURE 4 there is shown a modification of the invention wherein a flow control member 27' is seated on a shoulder 30' which is somewhat larger than and concentric with the outlet passageway 39. This flow control member in characteristic and function is much like that heretofore discussed.

It will be observed that the well 27b within which the flow control 27' is seated is itself open at its upper end and closed by a rubber plug 28b, which is held in position by the plate 47. This design permits the flow control to be dropped into position during assembly.

In any event, it is important to understand that a valve unit has been provided wherein each of two valving members must be moved to a "port open" condition in order to permit fluid flow through the valve and that as a result of this dual valve arrangement, a safety factor is provided which has not been found in earlier valves.

It will be understood that this embodiment of the invention has been used for illustrative purposes only and that various modifications and variations in the invention may be effected without departing from the spirit and scope of the novel concepts thereof.

I claim as my invention:
1. A fluid control valve comprising
a valve body having an inlet and an outlet,
first and second annular chambers opening to different sides of said valve body,
means communicating said inlet with said first annular chamber,
a flow passage formed concentrically of and within said first annular chamber and opening to said second annular chamber,
a second flow passage formed concentrically of and within said second annular chamber and opening to said outlet,
wall sections forming a part of said valve body and partitioning the said annular passageways from the said flow passages and having lips formed about the outer ends thereof serving to define said passages,
means providing a closed fluid path between said annular passageways and said passages,
valve means cooperable with said lips to control the flow of fluid therepast, and
electrically energizable valve means connected in parallel with one another for simultaneous energization and cooperable with each of said lips to control flow of fluid therepast.

2. The fluid control valve constructed in accordance with claim 1 wherein a constant-rate-of-flow-maintaining device is disposed within said inlet to control the passage of fluid through said valve.

3. The fluid control valve constructed in accordance with claim 1 wherein a constant-rate-of-flow-maintaining device is disposed within said outlet to control the passage of fluid from said valve.

References Cited

UNITED STATES PATENTS

| 1,710,815 | 4/1929 | Ebinger | 137—614.11 X |
| 2,031,478 | 2/1936 | Gray | 137—613 X |
| 2,526,069 | 10/1950 | Douglas | 137—614.11 X |
| 2,587,356 | 2/1952 | McPherson | 137—613 |
| 2,644,662 | 7/1953 | Powers | 137—613 X |
| 2,712,324 | 7/1955 | Lund | 137—613 X |

FOREIGN PATENTS 622,302  6/1961  Canada.

WILLIAM F. O'DEA, *Primary Examiner.*

D. H. LAMBERT, *Assistant Examiner.*